(12) United States Patent
Kim et al.

(10) Patent No.: US 6,377,351 B1
(45) Date of Patent: Apr. 23, 2002

(54) FIBER LASER GYROSCOPE WITH PHASE SENSITIVE DETECTION

(75) Inventors: Byoung Yoon Kim, Taejon; Jong Bum Hong, Seoul; Young Bae Yeo, Taegu; Bong Wan Lee, Taejon, all of (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/434,170

(22) Filed: Nov. 4, 1999

(30) Foreign Application Priority Data

May 4, 1999 (KR) .............................................. 99-16056

(51) Int. Cl.[7] .............................................. G01C 19/72
(52) U.S. Cl. ...................................... 356/460; 356/461
(58) Field of Search ................................ 356/460, 461; 250/227.19, 227.27; 385/12

(56) References Cited

U.S. PATENT DOCUMENTS 4,545,682 A * 10/1985 Greenwood ................. 356/350
5,969,816 A * 10/1999 Kim .......................... 356/350

* cited by examiner

*Primary Examiner*—Paul Dzierzynski
*Assistant Examiner*—Gioacchino Inzirillo
(74) *Attorney, Agent, or Firm*—Oliff & Berridge, PLC

(57) ABSTRACT

A fiber-optic laser gyroscope having phase sensitive detecting means which can reduce rotation rate measurement errors. In the fiber-optic laser gyroscope, errors due to the relative intensity difference between two consecutive pulses, which was an error factor in rotation rate measurement through time interval measurement between two adjacent pulses, can be eliminated by having a phase sensitive detection means which may extract and detect only components having the same phase as that of a phase-modulated signal from components having the same frequency as that of a phase-modulated signal. An output from the phase sensitive detecting means has an additional characteristic of being linearly proportional to rotation rate. The fiber-optic laser gyroscope of the present invention, therefore, has a characteristic of a relatively simple signal processing compared to conventional interferometric fiber gyroscopes.

15 Claims, 6 Drawing Sheets

FIBER LASER GYROSCOPE WITH PHASE SENSITIVE DETECTION

BACKGROUND OF THE INVENTION

1. Field of the Invention

The present invention relates to a laser gyroscope, and more particularly, to a fiber-optic laser gyroscope having phase sensitive detecting means which can reduce rotation rate measurement errors.

2. Description of the Prior Art

Figure 1:
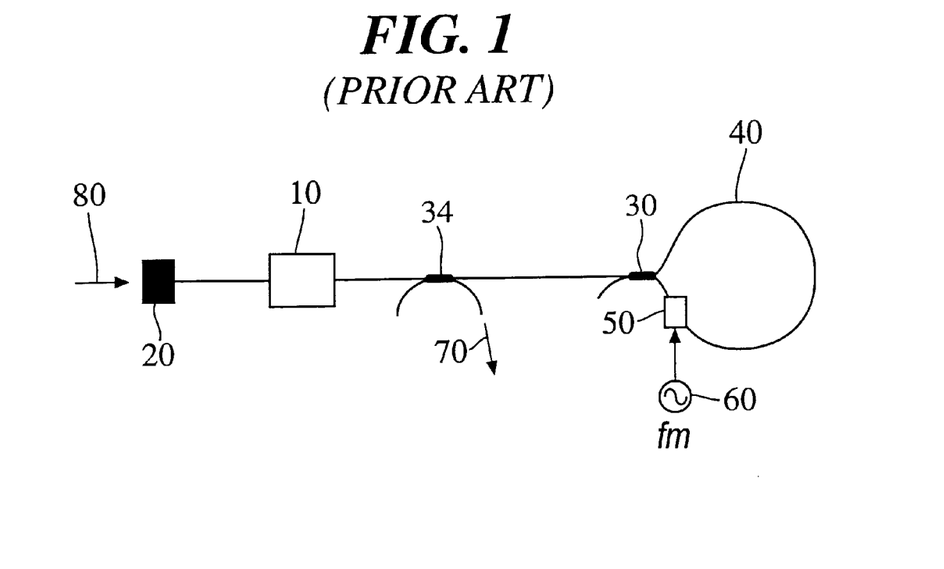
FIG. 1 shows a schematic configuration of a conventional fiber laser gyroscope.

FIG. 1 shows a schematic diagram of a conventional fiber laser gyroscope. Referring to FIG. 1, the conventional fiber laser gyroscope is constructed with a laser resonator having an optical amplifier 10 positioned midway, a mirror 20 attached at one end thereof, and a fiber-optic loop reflector which comprises a directional coupler 30 and a fiber-optic coil 40 connected at the other end thereof via a directional coupler 30, which performs role of a mirror and a rotation sensing element as well. The fiber-optic loop reflector is provided with a phase modulator 50. When mode-locking occurs in the laser resonator by a function signal of a function generator applied to the phase modulator 50, an output 70 from another directional coupler 34 has the form of pulse train with its time interval change depending upon rotation.

Referring back to FIG. 1, the operation of the above conventional fiber laser gyroscope will be described.

When a pumping light 80 is transmitted into the optical amplifier 10, the light is absorbed by the optical amplifier 10, and light having new wavelength is oscillated. The light oscillated as such is input into the directional coupler 30 of the fiber-optic loop reflector and divided into two light beams, and the separated beams propagate in opposite directions around the fiber-optic coil 40. Then, the two beams are recombined at the directional coupler 30 to interfere with each other. Then, a phase difference between two interfering light beams has a feature of being linearly proportional to the rotation rate due to Sagnac effect. If a function signal which has a frequency $f_m$ corresponding to the longitudinal mode spacing of this laser resonator is applied to the phase modulator 50, the phase difference between two light beams propagating around the fiber-optic coil 40 in opposite directions is modulated, thereby a mode-locking occuring among longitudinal modes of the laser resonator.

Figure 2A:
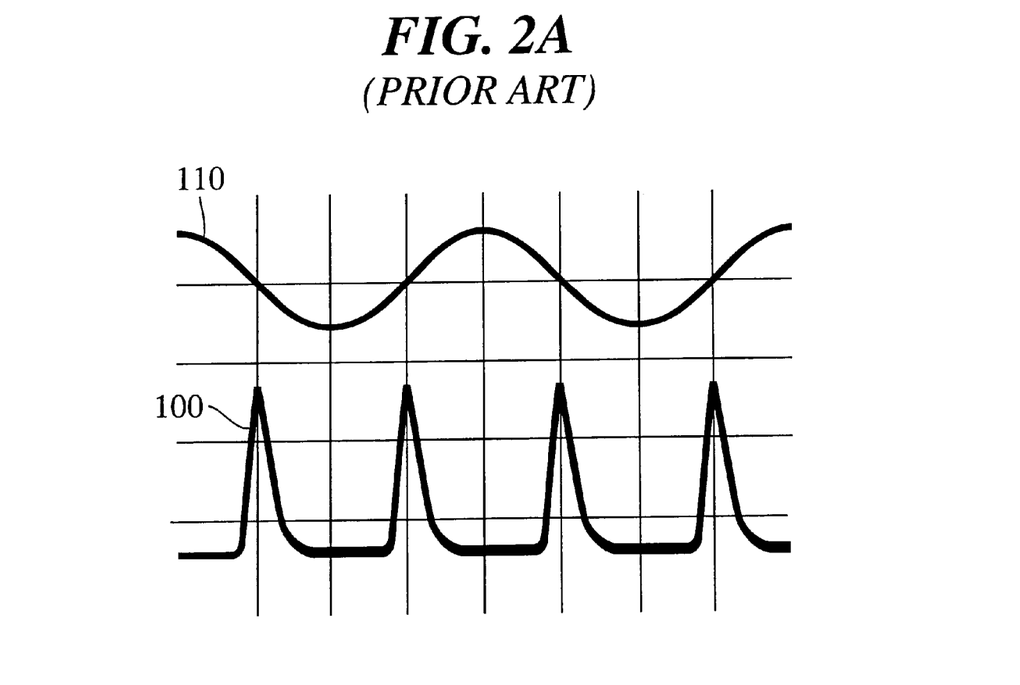
FIG. 2A and FIG. 2B are graphs of output pulse trains observed with an oscilloscope, respectively, when a conventional fiber laser gyroscope is in static and rotational state.
Figure 2B:
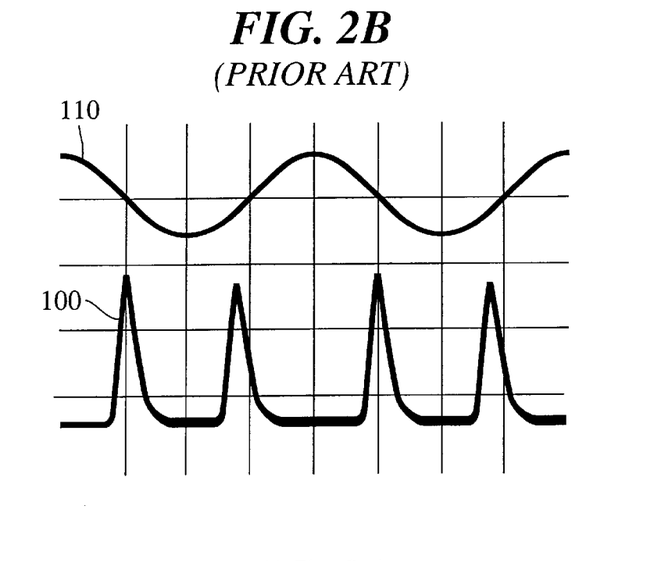

FIG. 2A and FIG. 2B show pulse trains observed respectively with an oscilloscope, which are outputs when the conventional fiber laser gyroscope is in static and rotational state. Mode-locked pulses 100 are generated such that two periodic pulses are generated in respect to one phase modulation 110 period ($T_m=1/f_m$). When the fiber-optic loop reflector is stationary, mode-locked pulses 100 are generated in an equal spacing, as illustrated in FIG. 2A. When the fiber-optic loop reflector rotates, however, two mode-locked pulses, generated in respect to one phase modulation period, are shifted in opposite directions with each other, as shown in FIG. 2B, therefore the mode-locked pulses 100 no longer have an equal spacing.

Then, the shifts of two pulses due to rotation have same absolute value, but are opposite in direction. The time interval between two pulses shifted in opposite directions with each other changes depending upon a rotation rate, in which the changing values (ΔT) can be represented by the following equation 1:

$$\Delta T = \frac{T_m}{\pi}\sin^{-1}\left(\frac{\phi_R}{\phi_m}\right) \quad \text{(equation 1)}$$

where, $T_m$ is a phase difference modulation period and has a relationship of $T_m=1/f_m$ to the frequency $f_m$ of the function signal. $\phi_m$ is a depth of phase difference modulation, and $\phi_R$ is a Sagnac phase shift due to rotation, which is a phase difference between two light beams propagating around the fiber-optic coil 40 in opposite directions with each other, and has a relationship as the following equation 2:

$$\phi_R = \frac{2\pi LD}{\lambda c}\Omega \quad \text{(equation 2)}$$

where, L is a length of the entire optical fiber of the fiber-optic loop reflector which is a fiber-optic rotation sensing element, D is a diameter of the fiber-optic loop reflector, λ is a frequency of the propagating light, c is the light velocity in vacuum, and Ω is a rotational angular velocity of the rotation sensing element, respectively. That is, if the fiber-optic rotation sensing element is rotating in a rotational angular velocity Ω, a Sagnac phase shift ($\phi_R$) is generated by equation 2, with the result that the time interval between two pulses changes by ΔT as in equation 1. And, if the fiber-optic rotation sensing element rotates in the opposite direction, the sign of $\phi_R$ becomes opposite, and the sign of ΔT also becomes opposite. That is, the displacement of the pulse becomes opposite. Therefore, the rotation rate can be measured by reading temporal pulse displacement directly on the time axis.

Figure 3A:
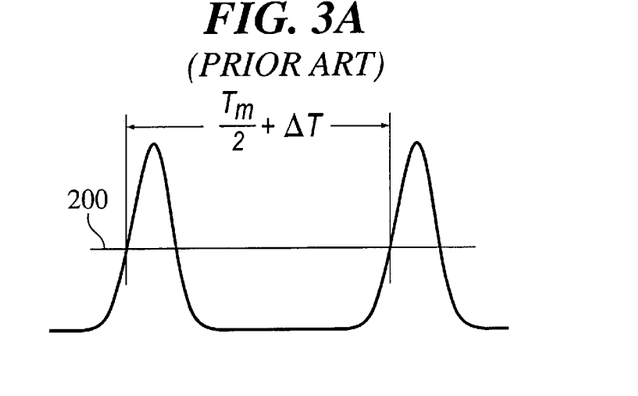
FIG. 3A is a graph showing a time interval measurement method using a conventional electrical counter.

Up to now, signal processing has been carried out by directly measuring the variation of time interval due to the temporal pulse displacement on the time axis using an electrical counter. The time interval measurement by the electrical counter is carried out on the basis of a specific trigger level. As shown in FIG. 3A, counting is started at the moment when the intensity of pulse signal is at least same as the predetermined trigger level 200, and stopped at the next moment thereof, in which the counted time therealong is a time interval between two pulses. However, the method is operated by a digital counter and includes counting error of maximum 1 digit.

Figure 3B:
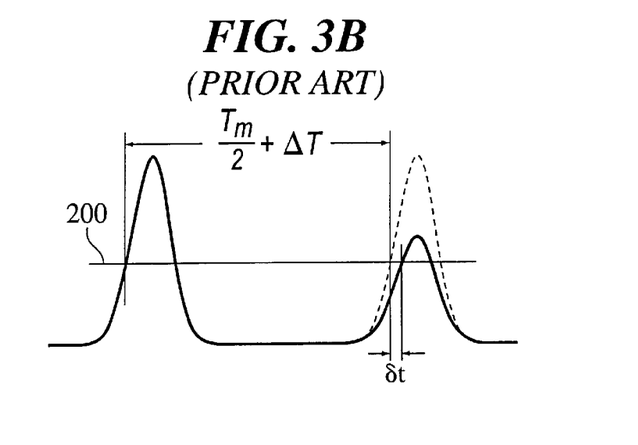
FIG. 3B is a graph for illustrating an error occurring in a time interval measurement using a conventional electrical counter, when the intensity difference exists between two pulses.

Generally, in a fiber laser gyroscope, peak intensities of two pulses are different from each other due to the gain competition between two pulses. If the intensities of two pulses are different from each other, the above conventional time interval measurement method induces measurement errors by δt, as shown in FIG. 3B. Therefore, the time interval measurement method is not appropriate as a signal processing method for a fiber laser gyroscope with high accuracy.

SUMMARY OF THE INVENTION

Therefore, it is an object of the present invention to provide a fiber laser gyroscope comprising phase sensitive detecting means as a signal processing method which eliminates errors due to the relative intensity difference between two pulses.

The fiber laser gyroscope of the present invention comprises: a laser resonator having a fiber-optic loop reflector at one end and a mirror at the other end thereof, the laser resonator including optical amplifying means and optical pumping means provided therein; phase modulating means, located in the fiber-optic loop reflector, for producing an optical pulse train; means for detecting the optical pulse train from the laser resonator to convert it into an electrical signal; and phase sensitive detecting means for extracting from the converted electrical signal a component having a frequency which is the same as or an integral multiple of that of a phase-modulated signal and having the same phase as the phase-modulated signal, and detecting from the extracted component the phase difference between two light beams passing through the fiber-optic loop reflector in opposite directions with each other.

Then, the phase sensitive detecting means can preferably extract the same frequency component as the phase-modulated signal from the converted electrical signal, and more preferably extract a direct current component together with the frequency component from the electrical signal.

In the gyroscope of the present invention, all optical fibers including the fiber-optic loop reflector are preferably comprised of single mode optical fibers or single mode polarization maintaining optical fibers. Furthermore, the phase modulating means may be selected from the group consisting of an optical fiber phase modulator, an integrated optic device where a directional coupler and a phase modulator are integrated, and an integrated optic device where a directional coupler, a phase modulator and a polarizer are integrated.

It is preferred that the frequency of the phase-modulated signal generated by the phase modulating means has a value differing from a longitudinal mode spacing of the laser resonator within a range of ±10% of the spacing or has an integral multiple of a value within the range, and the phase-modulated signal has a sine wave form or triangular wave form, and more preferably the frequency of the phase-modulated signal has the same value as a longitudinal mode spacing of the laser resonator or has an integral multiple value of the mode spacing.

Furthermore, the optical amplifier may preferably be selected from the group consisting of a rare-earth doped optical fiber amplifier, a semiconductor optical amplifier, and a semiconductor optical amplifier with an anti-reflection coating formed on one side thereof, and in particular, an erbium doped optical fiber amplifier is preferred when a rare-earth doped optical fiber amplifier is utilized.

A polarizer is preferably disposed between the mirror and the fiber-optic loop reflector, and more preferably between the optical amplifier and the fiber-optic loop reflector. The polarizer is preferably comprised of a fiber-optic polarizer or an integrated optic device where a directional coupler, a phase modulator and a polarizer are incorporated.

It is preferred that the mirror is a planar mirror, or a mirror having a wavelength selectivity such as Bragg gratings. A directional coupler can be inserted between the mirror and the fiber-optic loop reflector for extracting optical output signal of the laser resonator.

DESCRIPTION OF THE PREFERRED EMBODIMENT

Preferred embodiments of the invention will be described hereinafter in reference with appended drawings.

Figure 4:
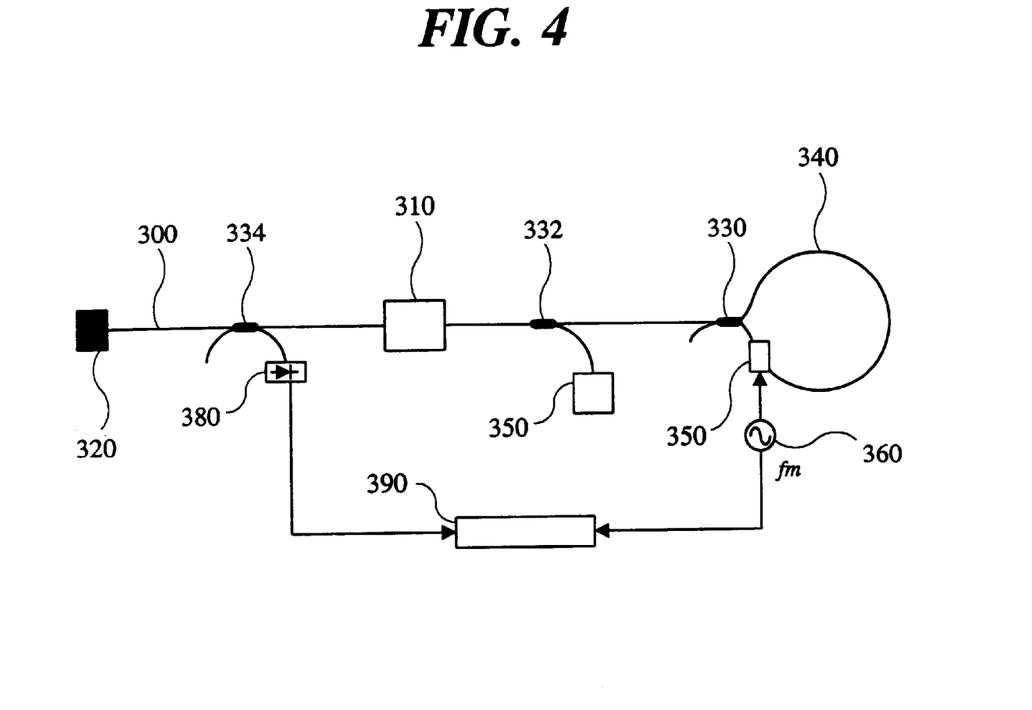
FIG. 4 shows a schematic view of a fiber laser gyroscope according to an embodiment of the present invention.

FIG. 4 is a schematic view of a fiber laser gyroscope according to an embodiment of the present invention showing the configuration, in which the signal processing element in the conventional fiber laser gyroscope of FIG. 1 is replaced by a phase sensitive detector such as a locking-in amplifier. The optical fiber laser gyroscope shown in FIG. 4 has a laser resonator configuration comprising an optical amplifier 310 positioned midway, a mirror 320 attached at one end thereof, and a fiber-optic loop reflector which comprises a directional coupler 330 and a fiber-optic coil 340 connected at the other end thereof via a directional coupler 330, in which the entire laser resonator is comprised of optical fibers 300. Function signal of a function generator 360 is applied to a phase modulator 350 located in the fiber-optic loop reflector and induce a mode-locking to make an output in the form of a pulse train.

When a pumping light 370 is transmitted into the optical amplifier 310, the light is absorbed by an optical amplifier 310 and light having new wavelength oscillates. In this embodiment, an erbium doped fiber amplifier was used as the optical amplifier 310.

There are several ways to transmit the pumping light 380 into the optical amplifier 310. One way of making the pumping light 380 transmitted is by using a WDM (Wavelength Division Multiplexer) coupler 332 as shown in FIG. 4, and otherwise the mirror 320 can also be chosen as a dichroic mirror in order to make the light transmitted therethrough.

Although WDM coupler 332 can be located at any position between the mirror 320 and the fiber-optic loop reflector, it is preferably located between the optical amplifier 310 and the fiber-optic loop reflector. The light oscillated as such is input into the directional coupler 330 of the fiber-optic loop reflector, where it is divided into two light beams and then the divided light beams propagate through the fiber-optic loop coil 340 in opposite directions with each other. Then, two light beams recombine at the directional coupler 330 to interfere with each other. Then, the phase difference between two interfering light beams has the feature of being linearly proportional to the rotational angular velocity due to Sagnac effect. When the phase modulator 350 is applied with a function signal with a frequency ($f_m$) corresponding to a longitudinal mode spacing of the laser resonator, the phase difference between two interfering light beams propagating through the fiber-optic loop reflector in opposite directions with each other is modulated, thereby mode-locking occurs among the longitudinal mode of the laser resonator.

There are no significant differences between this embodiment of the invention and the conventional technique up to this configuration. However, in this embodiment, another directional coupler 334 is inserted to detect any mode-locked pulse train, and the pulse train is converted into an electrical signal through a photo-detector 380 connected to the directional coupler 334. In this embodiment, although the directional coupler 334 is disposed between the optical amplifier 310 and the mirror 320, it may be disposed at any position between the optical amplifier 310 and the directional coupler 330. The photo-detector 380 may be also located by using any one or both of two output ends of the directional coupler 334. Then, the phase sensitive detector 390 is used to detect a component from the converted electrical signal which has same frequency as the phase-modulated signal and in the equal phase relationship with it as well.

The fiber laser gyroscope of the present invention operates as follows:

The output in the form of a mode-locked pulse train from the fiber laser gyroscope, when seen in the frequency domain, is composed of specific frequency components which are integral multiple of the frequency ($f_m$) of the function signal applied to the phase modulator, as for its harmonic components. When a function signal having a period $T_m$ is applied to the phase modulator located in the fiber-optic rotation sensing element, the time interval between two adjacent pulses is $T_m/2-\Delta T$, if the gyroscope is rotating. Here, $\Delta T$ is as indicated in equation 1. When the two pulses are supposed to have the intensity difference of $\alpha$, I(t) or the mode-locked laser pulse train of the fiber laser gyroscope can be represented as in equation 3:

$$I(t) = \sum_{n=-\infty}^{\infty} \left[ \left(1 + \frac{\alpha}{2}\right) I_0\left(t - nT_m + \frac{T_m}{4} - \frac{\Delta T}{2}\right) + \right. \quad \text{(equation 3)}$$

$$\left. \left(1 - \frac{\alpha}{2}\right) I_0\left(t - nT_m - \frac{T_m}{4} + \frac{\Delta T}{2}\right) \right]$$

where, $\alpha$ is the normalized intensity difference between two pulses, and n is an integer. $I_0(t)$ is the temporal intensity profile of an individual pulse with its peak at t=0, in which the temporal intensity profile of the two adjacent pulses are assumed to be same. In equation 3, I(t) is a periodic function having the period $T_m$, so that frequency components of the pulse train I(t) are composed of only harmonic components of the phase modulation frequency ($1/T_m$) by Fourier series expansion. Then, each harmonic component has a relationship as represented in equation 4 and 5 in respect to Sagnac phase shift $\phi_R$ of the equation 2:

$$a_n = (-1)^{n+1} 2c_n \sin\left[n\sin^{-1}\left(\frac{\phi_R}{\phi_m}\right) + \frac{(n-1)\pi}{2}\right] \quad \text{(equation 4)}$$

$$b_n = (-1)^n \alpha c_n \cos\left[n\sin^{-1}\left(\frac{\phi_R}{\phi_m}\right) + \frac{(n-1)\pi}{2}\right] \quad \text{(equation 5)}$$

where, the coefficient $c_n$ is a constant which changes according to the temporal intensity profile. The coefficient $c_n$ satisfies the following equation 6:

$$c_n = \frac{2}{T_m} \int_{-T_m/2}^{T_m/2} I_0(t) \cos n\omega_m t\, dt, \quad n = 0, 1, 2, \ldots \quad \text{(equation 6)}$$

Each of $a_n$ and $b_n$ is an amplitude of n-th harmonic component, in which $a_n$ represents a component in the same phase relationship with the function signal applied to the phase modulator among amplitudes of the n-th harmonic components, and is referred as an in-phase component. $b_n$ represents a component which has 90 degree phase difference in respect to a function signal applied to the phase modulator among the amplitudes of the n-th harmonic components, and is referred as a quadrature-phase component. And $\phi_m$ is the phase difference modulation depth. In equation 4 to 6, two pulses are assumed to exist in one modulation period $T_m$ only, and equation 1 was used in respect to $\Delta T$ while obtaining equation 4 and 5. Referring to equation 4 and 5, it can be understood that the influence due to $\alpha$ is shown in $b_n$ only. By measuring only $a_n$ using the phase sensitive detector, the errors due to intensity difference between two pulses can be eliminated. When compared to the method directly measuring time interval changes between two adjacent pulses, this phase sensitive detection method has an advantage that the influence due to the normalized intensity difference $\alpha$ between two pulses are eliminated. In particular, $a_1$ or the amplitude of the first harmonic component satisfies the following equation 7 and has the feature of being linearly proportional to Sagnac phase shift by rotation:

$$a_1 = 2c_1 \frac{\phi_R}{\phi_m} \quad \text{(equation 7)}$$

Therefore, outputs can be obtained by detecting only $a_1$ using a phase sensitive detector, which are linearly proportional to a rotation rate or Sagnac phase shift by rotation while being independent of the intensity difference $\alpha$ between two pulses. When compared to the conventional interferometric fiber gyroscope which is sine functionally proportional to Sagnac phase shift, the feature, in which the output is linearly proportional to Sagnac phase shift as above, endows a great advantage to an optical fiber laser gyroscope.

In the meantime, outputs independent of the average intensity change of the optical pulse can be obtained by measuring $a_n$ and a direct current component $a_0/2$ together and by dividing $a_n$ value by $a_0/2$ value, since all $c_n$ have the same intensity dependence. However, the intensity of spontaneous emission in a laser must be small enough to be ignored compared to the intensity of stimulated emission.

Figure 5:
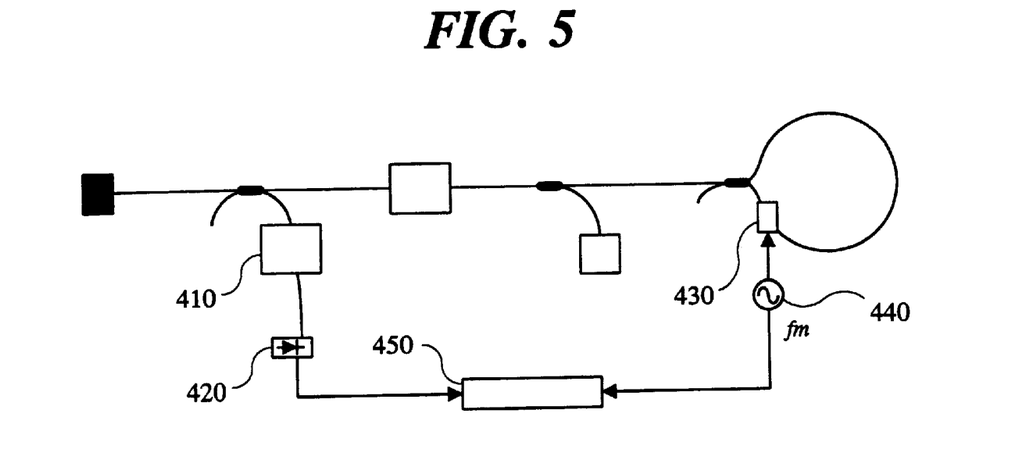
FIG. 5 shows an experimental setup for measuring an influence of the intensity difference between two adjacent pulses on a fiber laser gyroscope output.

FIG. 5 shows an experimental setup for measuring influences of a relative intensity difference between two adjacent pulses on an output of a gyroscope. In the same configuration with FIG. 4, an intensity modulator 410 is inserted at the front end of a photo-detector 420, in order to change the relative intensity difference between two pulses. The relative intensity difference between the two pulses are changed, by applying a function signal from a function generator 440 to the intensity modulator 410 which has same frequency as a function signal applied to a phase modulator 430.

Figure 6A:
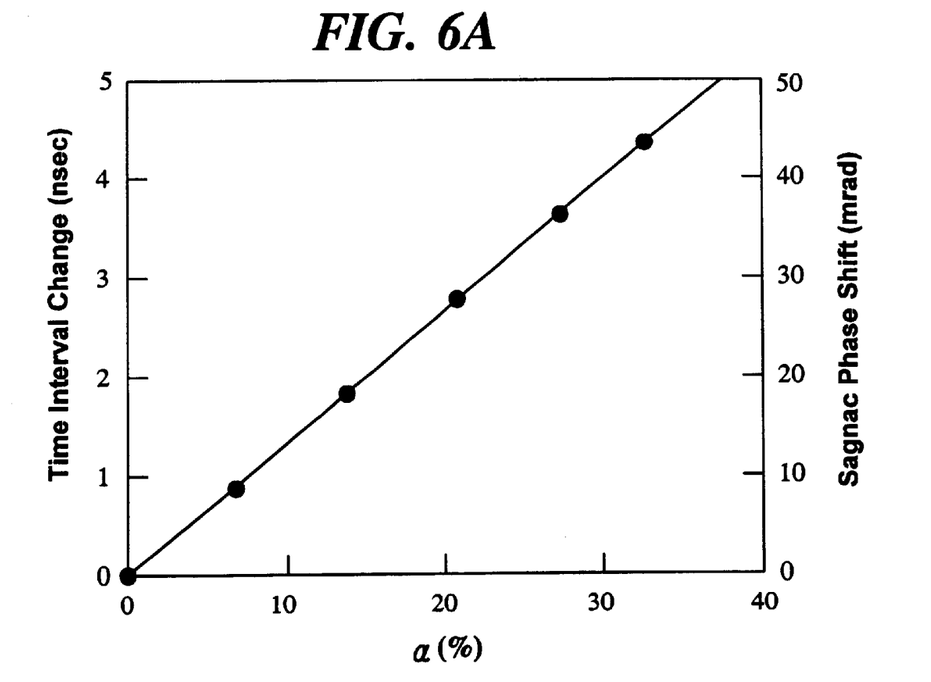
FIGS. 6A and 6B are graphs showing output changes of a fiber laser gyroscope obtained when the intensity difference between two pulses is changed in static state of the experimental setup of FIG. 5, respectively, in respect to when a time interval measuring device is used, and when a phase sensitive detector is used, as a signal processor.
Figure 6B:
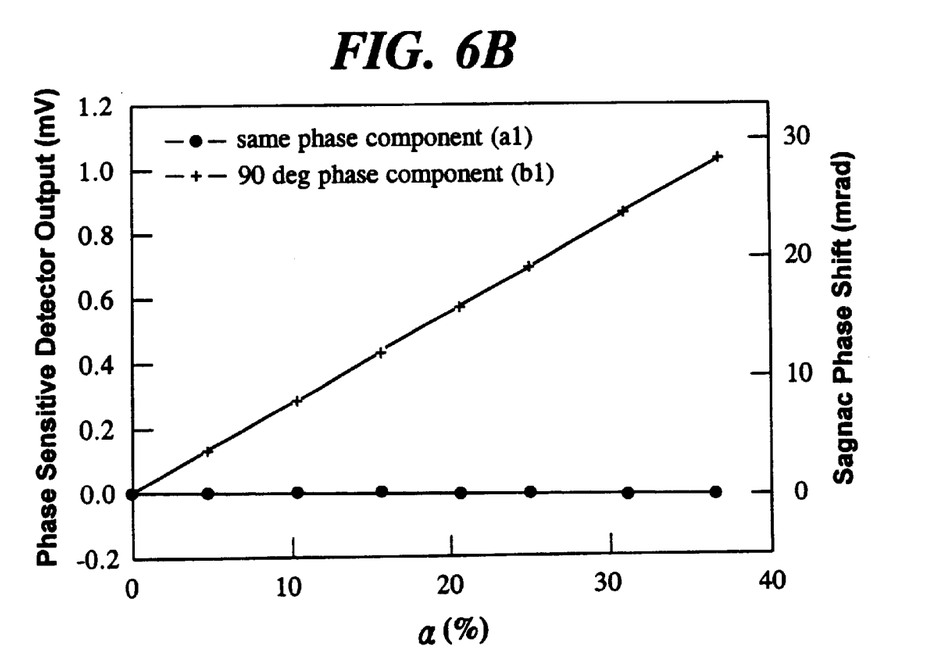

FIGS. 6A and 6B illustrate, output changes of the fiber laser gyroscope obtained in the static state when the intensity difference between two pulses is changed, respectively, in respect to i) when a time interval measuring device was used, and ii) when a phase sensitive detector was used, as a signal processor 450. When a time interval measuring device is used as a signal processor 450, it can be observed that the output changes together as the intensity difference between two pulses changes as shown in FIG. 6A. However, if a phase sensitive detector is used as a signal processor 450, it can be observed in FIG. 6B, that only the quadrature phase component $b_1$ changes together as the intensity difference between two pulses changes, while the component $a_1$ having same frequency and same phase relationship with a function signal applied into the phase modulator 430 remains constant, even though the intensity difference between two pulses changes, as expected in equation 7. Therefore, a stable output independent of the intensity difference between two pulses can be obtained by measuring only $a_1$ (or $a_n$) using the phase sensitive detector.

Figure 7:
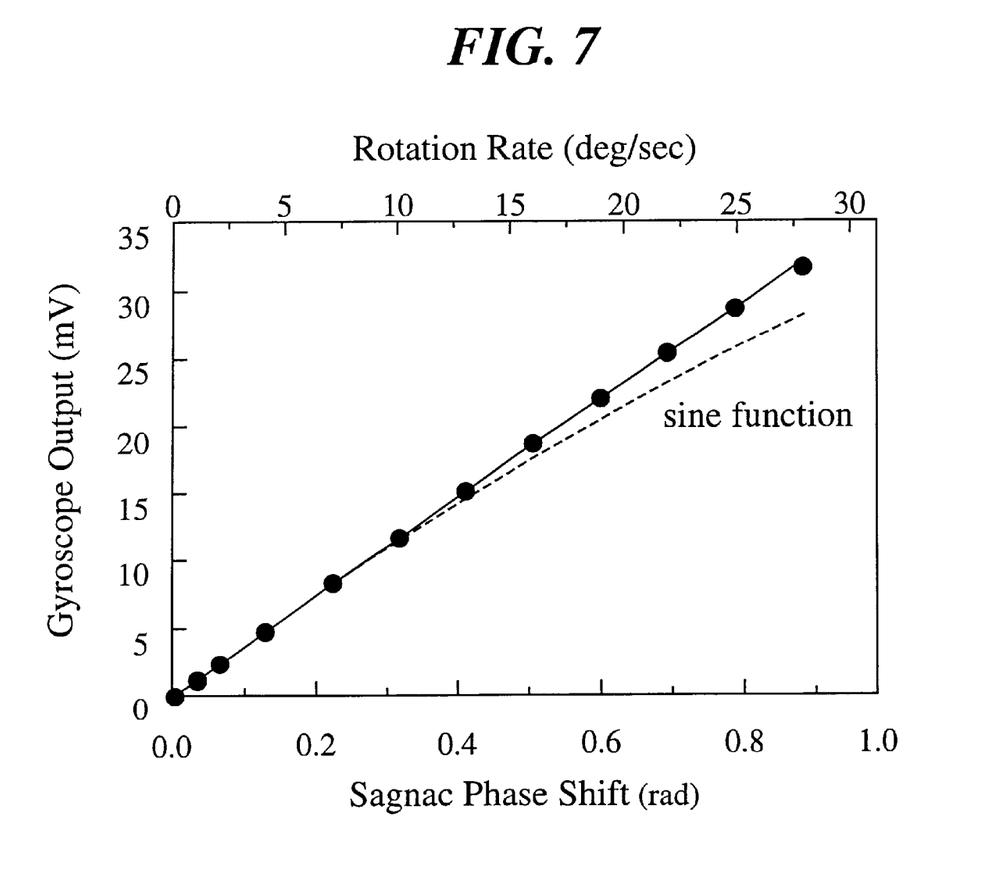
FIG. 7 is a graph showing the output change of the fiber laser gyroscope of the present invention according to a rotation rate change of the fiber-optic loop reflector.

FIG. 7 shows the plot of $a_1$ as a function of rotation rate of a fiber laser gyroscope employing the phase sensitive detecting means, in which $a_1$ shows a linear relationship to rotation rate as expected theoretically. The sine function indicated in a dotted line in FIG. 7 is a feature obtained in the case of the conventional interferometric fiber gyroscope. FIG. 7 shows that the fiber laser gyroscope of the present invention having a linear output feature has a more improved feature compared to the conventional interferometric fiber gyroscope.

Figure 8A:
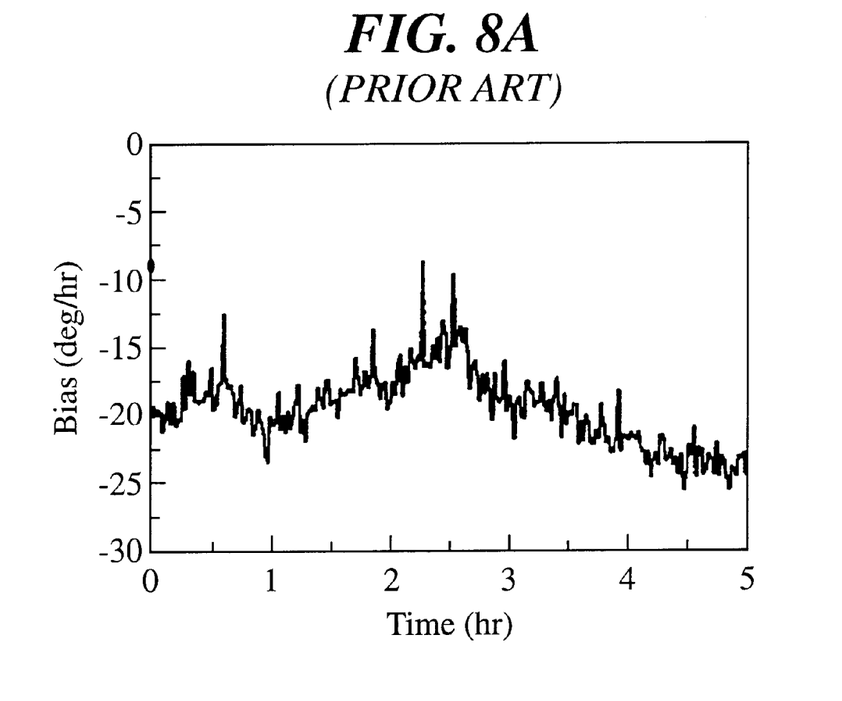
FIG. 8A is a graph showing bias stability of the conventional fiber laser gyroscope using a time interval measurement method.
Figure 8B:
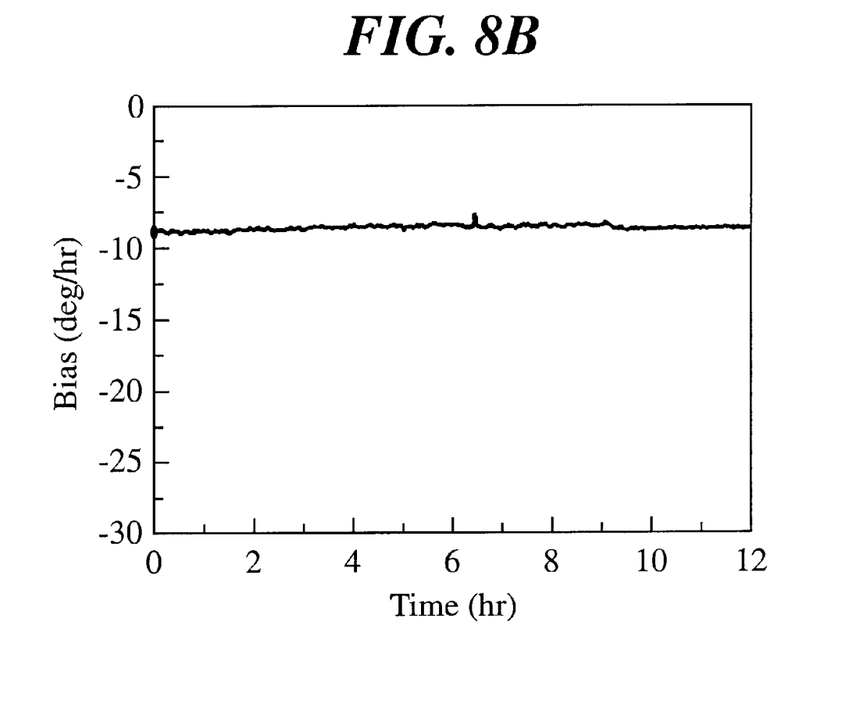
FIG. 8B is a graph showing bias stability of the fiber laser gyroscope of the present invention employing phase sensitive detecting means.

FIGS. 8A and 8B show the long-term stability of the optical fiber laser gyroscope (FIG. 4), respectively, in respect to when a time interval measuring device was used and when a phase sensitive detector was used as the signal processor 450 in FIG. 5. It can be seen that FIG. 8B shows much more improved result than FIG. 8A, in all of drift, temporal noise and offset. Drift decreased greatly from about 13 deg/hr to about 0.8 deg/hr and temporal noise decreased from about 0.05 deg/$\sqrt{hr}$ to about 0.018 deg/$\sqrt{hr}$. It can be understood, therefore, that the performance of the fiber laser gyroscope can be greatly improved by using a phase sensitive detector instead of a time interval measuring device.

As herein above described in detail, the fiber laser gyroscope of the present invention employing phase sensitive detecting means can eliminate errors due to an intensity difference between two pulses, therefore reducing errors in a rotation rate measurement. The signal processing is also advantageously simple compared to the conventional interferometric fiber gyroscope, due to the feature that the output is linearly proportional to rotation rate.

What is claimed is:

1. A fiber-optic laser gyroscope comprising:
   a laser resonator having a fiber-optic loop reflector at one end and a mirror at the other end thereof, said laser resonator including optical amplifying means and optical pumping means provided therein;
   phase modulating means, located in said fiber-optic loop reflector, for producing an optical pulse train;
   means for detecting said optical pulse train from said laser resonator to convert it into an electrical signal; and
   phase sensitive detecting means for extracting from said converted electrical signal a component having a frequency which is the same as or an integral multiple of that of a phase-modulated signal and having the same phase as said phase-modulated signal, and detecting from said extracted component a phase difference between two light beams passing through said fiber-optic loop reflector in opposite directions with each other.

2. The fiber-optic laser gyroscope of claim 1, wherein all optical fibers including said fiber-optic loop reflector are comprised of single mode optical fibers or single mode polarization maintaining optical fibers.

3. The fiber-optic laser gyroscope of claim 1, wherein said phase modulating means is selected from the group consisting of an optical fiber phase modulator, an integrated optic device where a directional coupler and a phase modulator are integrated, and an integrated optic device where a directional coupler, a phase modulator and a polarizer are integrated.

4. The fiber-optic laser gyroscope of claim 1, wherein said optical amplifier is selected from the group consisting of a rare-earth doped fiber amplifier, a semiconductor optical amplifier, and a semiconductor optical amplifier with an anti-reflection coating formed on one side thereof.

5. The fiber-optic laser gyroscope of claim 1, further comprising a polarizer disposed between said mirror and said fiber-optic loop reflector.

6. The fiber-optic laser gyroscope of claim 5, wherein said polarizer is a fiber-optic polarizer or an integrated optic device where a directional coupler, a phase modulator and a polarizer are incorporated.

7. The fiber-optic laser gyroscope of claim 1, wherein said mirror is a planar mirror, or a mirror having a wavelength selectivity such as Bragg gratings.

8. The fiber-optic laser gyroscope of claim 1, further comprising a directional coupler, inserted between said mirror and said fiber-optic loop reflector for extracting optical output signal of said laser resonator.

9. The fiber-optic laser gyroscope of claim 1, wherein said phase sensitive detecting means extracts the same frequency component as said phase-modulated signal from said converted electrical signal.

10. The fiber-optic laser gyroscope of claim 9, wherein said phase sensitive detecting means extracts a direct current component together with said frequency component from said electrical signal.

11. The fiber-optic laser gyroscope of claim 1, wherein the frequency of said phase-modulated signal has a value differing from a longitudinal mode spacing of the laser resonator within a range of ±10% of said mode spacing or has an integral multiple of a value within said range, and said phase-modulated signal has a sine wave form or triangular wave form.

12. The fiber-optic laser gyroscope of claim 9, wherein the frequency of said phase-modulated signal has a value differing from a longitudinal mode spacing of the laser resonator within a range of ±10% of said mode spacing or has an integral multiple of a value within said range, and said phase-modulated signal has a sine wave form or triangular wave form.

13. The fiber-optic laser gyroscope of claim 10, wherein the frequency of said phase-modulated signal has a value differing from a longitudinal mode spacing of the laser resonator within a range of ±10% of said mode spacing or has an integral multiple of a value within said range, and said phase-modulated signal has a sine wave form or triangular wave form.

14. The fiber-optic laser gyroscope of claim 9, wherein the phase difference between said two light beams propagating through said fiber-optic loop reflector in opposite directions with each other is given as $ka_1$, where k is a proportional constant, and $a_1$ is an amplitude of the frequency component which is the same as that of said phase-modulated signal and has the same phase as said phase-modulated signal.

15. The fiber-optic laser gyroscope of claim 10, wherein said two light beams propagating through said fiber-optic loop reflector in opposite directions with each other has a phase difference given as $k'a_1$, where $k'=2k/a_0$, $k$ is a proportional constant, $a_1$ is an amplitude of the frequency component which is the same as that of said phase-modulated signal and has the same phase as said phase-modulated signal, and $a_0/2$ is an amplitude of the direct current component.

* * * * *